(12) United States Patent
Terano et al.

(10) Patent No.: US 6,355,725 B2
(45) Date of Patent: Mar. 12, 2002

(54) PROPYLENE-ETHYLENE BLOCK COPOLYMER COMPOSITIONS AND PROCESSES FOR PRODUCTION THEREOF

(75) Inventors: Minoru Terano, c/o Japan Advanced Institute of Science and Technology, Hokuriku, 15, Asahidai, Tatsunokuchi-cho, Noubi-gun, Ishikawa-ken; Takahiro Oka; Nobutoshi Komori, both of Ichihara; Tetsuya Matsukawa, Yokohama, all of (JP)

(73) Assignees: Chisso Corporation, Osaka-fu; Chisso Petrochemical Corporation, Tokyo; Minoru Terano, Ishikawa-ken, all of (JP)

( * ) Notice: Subject to any disclaimer, the term of this patent is extended or adjusted under 35 U.S.C. 154(b) by 0 days.

(21) Appl. No.: 09/764,384

(22) Filed: Jan. 19, 2001

Related U.S. Application Data

(62) Division of application No. 09/058,302, filed on Apr. 10, 1998, now Pat. No. 6,211,300.

(51) Int. Cl.[7] ............................................. C08L 23/14
(52) U.S. Cl. ........................................ 525/52; 526/348
(58) Field of Search ............................. 525/52; 526/348

(56) References Cited

U.S. PATENT DOCUMENTS

| | | |
|---|---|---|
| 4,408,019 A | 10/1983 | Blunt |
| 4,491,652 A | 1/1985 | Matthews et al. |
| 5,703,172 A | 12/1997 | Watanabe et al. |
| 5,753,769 A | 5/1998 | Ueda et al. |
| 5,854,355 A | 12/1998 | Oka et al. |
| 5,990,235 A | 11/1999 | Terano |
| 5,990,242 A | 11/1999 | Naga et al. |
| 6,011,102 A | 1/2000 | Shimojo et al. |

FOREIGN PATENT DOCUMENTS

| | | |
|---|---|---|
| DE | 41 21 368 | 1/1993 |
| EP | 0 041 361 | 12/1981 |
| EP | 0 537 130 | 9/1992 |
| EP | 0 537 686 | 4/1993 |
| EP | 0 545 303 | 6/1993 |
| EP | 0 545 304 | 6/1993 |
| JP | 50-108385 | 8/1975 |
| JP | 50-126590 | 10/1975 |
| JP | 51-92885 | 8/1976 |
| JP | 52-100596 | 8/1977 |
| JP | 52-147688 | 12/1977 |
| JP | 54-152095 | 11/1979 |
| JP | 56-811 | 1/1981 |
| JP | 56-11908 | 2/1981 |
| JP | 56-155208 | 12/1981 |
| JP | 57-55906 | 4/1982 |
| JP | 58-138710 | 8/1982 |
| JP | 58-83006 | 5/1983 |
| JP | 58-138706 | 8/1983 |
| JP | 58-138707 | 8/1983 |
| JP | 58-201816 | 11/1983 |
| JP | 63-66206 | 3/1988 |
| JP | 1-217012 | 8/1989 |
| JP | 2-242804 | 9/1990 |
| JP | 2-255812 | 10/1990 |
| JP | 4-211694 | 8/1992 |
| JP | 4-275294 | 9/1992 |
| JP | 5-178923 | 7/1993 |
| JP | 5-209013 | 8/1993 |
| JP | 6-80720 | 3/1994 |
| JP | 6-122718 | 5/1994 |
| JP | 6-145240 | 5/1994 |
| JP | 6-172433 | 6/1994 |
| WO | 91/12285 | 8/1991 |
| WO | 92/05208 | 4/1992 |
| WO | 94/21700 | 9/1994 |
| WO | 95/07937 | 3/1995 |

*Primary Examiner*—Veronica P. Hoke
(74) *Attorney, Agent, or Firm*—McDermott, Will & Emery

(57) ABSTRACT

A propylene-ethylene block copolymer composition is disclosed which comprises 0.01 to 10% by weight of an A-B type propylene-ethylene block copolymer (C) consisting essentially of a polypropylene segment (A) and an ethylene-propylene random copolymer segment (B), and 99.99 to 90% by weight of a propylene polymer (D), wherein the A-B type propylene-ethylene block copolymer (C) comprises 5 to 80% by weight of the ethylene-propylene random copolymer segment (B) having an ethylene content of 10 to 90% by weight and the propylene polymer (D) comprises 60 to 95% by weight of a homopolymer of propylene or a copolymer of propylene containing a copolymerizable monomer therewith (D1) and 40 to 5% by weight of an ethylene-propylene random copolymer (D2).

7 Claims, 1 Drawing Sheet

PROPYLENE-ETHYLENE BLOCK COPOLYMER COMPOSITIONS AND PROCESSES FOR PRODUCTION THEREOF

This appl. is a Div. of Ser. No. 09/058,302 filed Apr. 10, 1998, U.S. Pat. No. 6,211,300.

FIELD OF THE INVENTION

This invention relates to new propylene-ethylene block copolymer compositions. More particularly, it relates to propylene-ethylene block copolymer compositons which are excellent not only in impact-resistance, but also in transparency, stress-whitening resistance, gloss and tensile elongation, and processes for the production thereof.

BACKGROUND OF THE INVENTION

Crystalline polypropylenes produced by using a stereoregular olefin polymerization catalyst are excellent in rigidity and heat-resistance, but have a poor impact resistance, particularly that at low temperatures, which leads to limited use in various fields. As a method to provide improved impact resistance at low temperatures, there has been proposed a process to block copolymerize propylene with other $\alpha$-olefins such as ethylene. However, the resulting block copolymers are more improved in impact resistance at low temperatures than crystalline polypropylenes, but provide lowering in rigidity, hardness, heat resistance, transparency, whitening resistance, gloss, tensile elongation and the like, whereby the use thereof is restricted.

In order to solve the above-mentioned problems encountered in the block copolymers, a number of methods have been proposed, for example, a method which comprises a first step of homopolymerizing propylene in the presence of a catalyst for a streoregular polymerization, a second step of copolymerizing a mixed monomer of ethylene and propylene, and then stepwisely repeating the propylene homopolymerization and the ethylene-propylene copolymerization. In relation to the above-mentioned multi-stage polymerization method, Japanese Patent Kokai 54-152095 discloses using a titanium trichloride solid catalyst, and Japanese Patent Kokai 58-201816 discloses using an organoaluminum compound and an electron donating compound in combination with a titanium tetrachloride solid catalyst.

There have also been proposed a propylene block copolymer consisting of a crystalline polypropylene block and an ethylene-propylene random copolymer block, wherein the crystalline polypropylene block content is 55 to 95 percent by weight and the intrinsic viscosity ratio of the both blocks as well as the glass transition temperature of the ethylene-propylene random copolymer block are restricted; and a polypropylene block copolymer which consists of a polymer block mainly comprising propylene and an ethylene-propylene random copolymer block, wherein the intrinsic viscosity ratio of the both blocks and the intrinsic viscosity of the ethylene-propylene random copolymer block are restricted, and wherein the resulting block copolymer is melt kneaded.

SUMMARY OF THE INVENTION

An object of the invention is to provide a propylene-ethylene block copolymer compositon which is improved in transparency, stress-whitening resistance, gloss and tensile elongation and has a high impact resistance.

Another object of the invention is to provide a method for the production of the propylene-ethylene block copolymer composition.

We have extensively studied on the improvement in the impact resistance of known propylene-ethylene block copolymers and the factors which affect transparency, stress-whitening resistance, gloss and tensile elongation of the copolymers, and have found that those referred to as "block copolymer" in the prior art are in the state of a micro-blend in which a polypropylene segment and an ethylene-propylene copolymer segment are not chemically bonded and also that the propylene-ethylene block copolymers are formulated into a copolymer composition containing a true block copolymer as defined in a polymer chemistry in which the polypropylene segment and the ethylene-propylene copolymer segment are chemically bonded, thereby providing the improvement in transparency, stress-whitening resistance, gloss and tensile elongation, as well as impact resistance.

According to the invention, there is provided a propylene-ethylene block copolymer composition (E) which comprises 0.01 to 10% by weight of an A-B type propylene-ethylene block copolymer (C) consisting essentially of a polypropylene segment (A) and an ethylene-propylene random copolymer segment (B), and 99.99 to 90% by weight of a propylene polymer (D), wherein the A-B type propylene-ethylene block copolymer (C) comprises 5 to 80% by weight of the ethylene-propylene random copolymer segment (B) having an ethylene content of 10 to 90% by weight and the propylene polymer (D) comprises 60 to 95% by weight of a homopolymer of propylene or a copolymer of propylene containing a copolymerizable monomer therewith (D1) and 40 to 5% by weight of an ethylene-propylene random copolymer (D2).

Further, the present invention provides a process of producing a propylene-ethylene block copolymer composition (E) which comprises the sequential steps of:

a) continuously supplying an olefin polymerization catalyst and a propylene monomer to the top area of a tubular type continuous polymerization apparatus to produce a polypropylene segment (A);

b) continuously supplying an ethylene monomer to the intermediate area of the tubular type continuous polymerization apparatus in which the ethylene monomer and the propylene monomer unreacted in the step (a) are copolymerized to produce an ethylene-propylene random copolymer segment (B) and sequentially the segment (B) is chemically bonded to the terminal of the polypropylene segment (A) by a covalent bond to produce an A-B type propylene-ethylene block copolymer (C);

c) transferring the A-B type propylene-ethylene block copolymer (C) containing the olefin polymerization catalyst produced in the step (b) to a single- or multi-stage polymerization reactor equipped with an agitator;

d) supplying a propylene monomer or a mixed monomer of a propylene monomer and a copolymerizable monomer therewith to the polymerization reactor, followed by copolymerizing in the presence of the olefin polymerization catalyst and the A-B type propylene-ethylene block copolymer (C) to produce a propylene polymer (D1); and e) supplying a mixed monomer of ethylene and propylene to the polymerization reactor, followed by copolymerizing in the presence of the olefin polymerization catalyst, the A-B type propylene-ethylene block copolymer (C) and the propylene polymer (D1) to produce an ethylene-propylene random copolymer (D2), wherein each polymerization time in the steps a) and b) is controlled within the range of from 0.01 to 10 seconds.

DETAILED DESCRIPTION OF THE INVENTION

Figure 1:
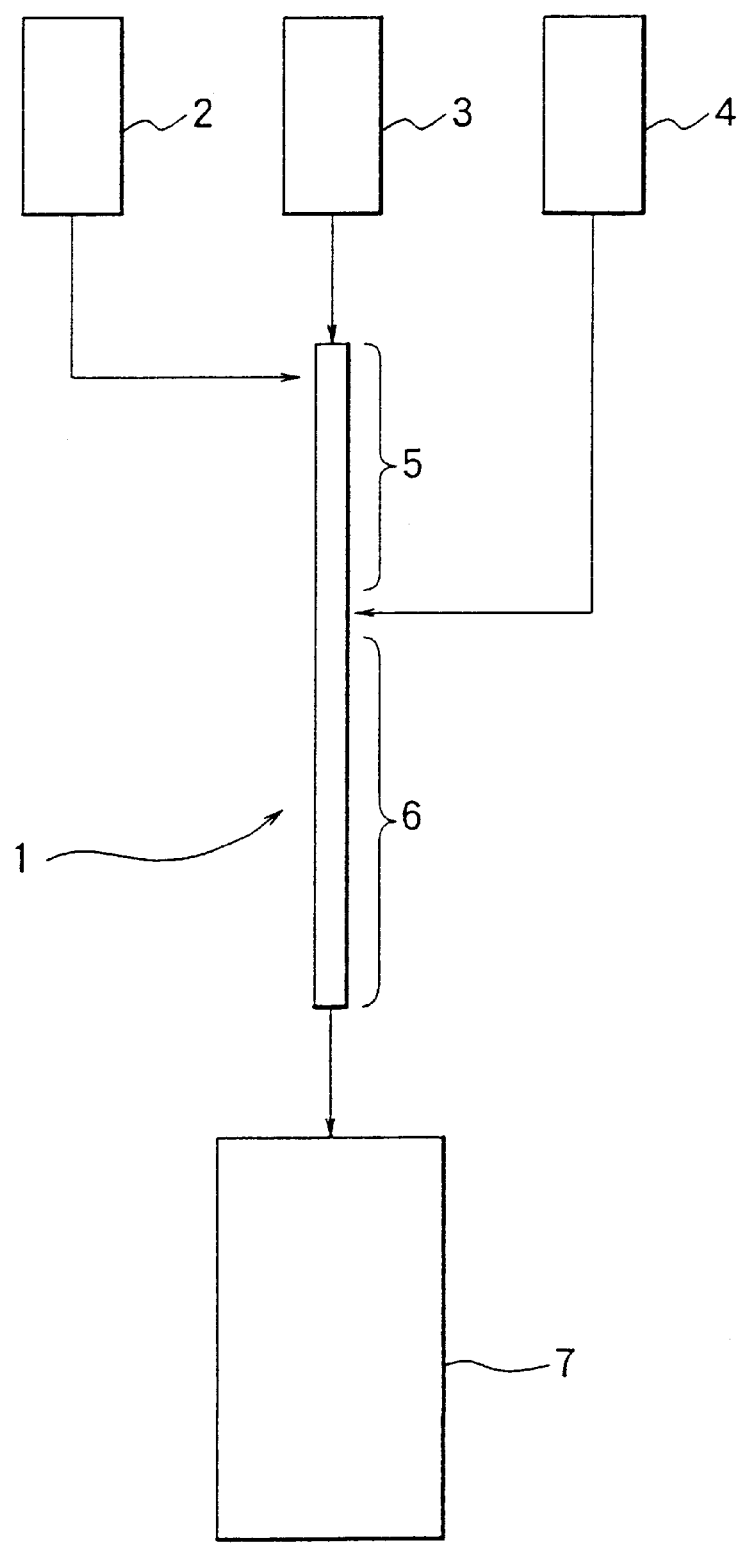
FIG. 1 is a schematic view showing the outline of the tubular type continuous polymerization apparatus and the polymerization reactor used in the present invention.

The propylene-ethylene block copolymer composition (E) of the invention comprises an A-B type block copolymer (C) wherein the propylene segment (A) and the ethylene-propylene random copolymer segment (B) are chemically bonded through a covalent bond.

It has been found that, in the A-B type block copolymer (C), the polypropylene segment (A) and the ethylene-propylene random copolymer segment (B) are chemically bonded through a covalent bond because the weight tiff loss of the copolymer (C) upon extraction with n-heptane is extremely low. On the other hand, the micro-blend of the polypropylene and propylene-ethylene random copolymer shows a very high weight loss upon n-heptane extraction because the ethylene-propylene random copolymer is extracted with the n-heptane.

A molecular weight distribution curve of the A-B type block copolymer (C) shows one peak, whereas that of the micro-blended polymers shows at least two peaks, one corresponding to the polypropylene component and the other to the propylene-ethylene random copolymer component.

The intrinsic viscosity of the A-B type block copolymer (C) affects the impact resistance of the final propylene-ethylene copolymer composition (E); if it is too low, improvement in an impact resistance cannot be achieved. It is preferable that the intrinsic viscosity [η] of the A-B type block copolymer (C) is equal to or more than 0.2 dl/g ([η]≧0.2 dl/g), more preferably equal to or more than 0.5 dl/g ([η]≧0.5 dl/g).

The content of the ethylene-propylene copolymer segment (B) in the A-B type block copolymer (C) has an effect on various physical properties of the molded products made from the final propylene-ethylene copolymer (E). If the content thereof is too low, the resulting product will be decreased in impact resistance. On the other hand, if it is too high, the rigidity thereof will be decreased. The content of the ethylene-propylene copolymer segment (B) is usually 5 to 80 percent by weight, preferably 10 to 70 percent by weight based on the total weight of the A-B type block copolymer (C).

The ethylene content of the ethylene-propylene copolymer segment (B) has also an effect on various physical properties of the final propylene-ethylene copolymer composition (E). If the ethylene content is too low, the impact resistance of the resulting composition (E) will be decreased, whereas if it is too high, the transparency of said composition (E) will be decreased. The ethylene content of the ethylene-propylene copolymer segment (B) is preferably 10 to 90 percent by weight, more preferably 20 to 80 percent by weight.

If the content of the A-B type block copolymer (C) in the propylene-ethylene block copolymer composition (E) is too low, various physical properties of the final molded products, particularly a stress-whitening resistance, are lowered. If the content of said block copolymer (C) is too high, a yield per unit catalyst of the total polymers obtained in the presence of said block copolymer (C) is decreased. This is not preferable. The content of the A-B type block copolymer (C) is usually in a range of from 0.01 to 10 percent by weight, preferably 0.05 to 5 percent by weight based on the propylene-ethylene block copolymer composition (E).

In the propylene-ethylene block copolymer composition (E), the propylene polymer (D) comprises 60 to 95 percent by weight of the homo- or co-polymer (D1) of propylene which may contain the monomer copolymerizable with propylene and 5 to 40 percent by weight of the ethylene-propylene random copolymers (D2). If the content of the ethylene-propylene random copolymer (D2) is too low, the resulting molded product will not have a sufficient impact resistance, whereas if it is too high, the resulting molded product will be decreased in rigidity.

The copolymerizable monomers with propylene include ethylene, 1-butene, 4-methylpentene-1, styrene, non-conjugated dienes, and the like. The homo- or co-polymer (D1) of propylene may contain these comonomers in an amount of 0 to 10 percent based on the weight of the propylene.

If the ethylene content of the ethylene-propylene random copolymer (D2) is too low or too high, the resulting molded products will be decreased in impact resistance. The ethylene content of the ethylene-propylene random copolymer (D2) is preferably 10 to 90 percent by weight, more preferably 20 to 80 percent by weight.

The propylene-ethylene block copolymer composition (E) according to the invention can be produced in a tubular type continuous polymerization apparatus by, in the first stage, continuously supplying an olefin polymerization catalyst and a propylene monomer, and a mixture of propylene and ethylene monomers to prepare the A-B type block copolymers (C) which consist essentially of the propylene segment (A) and the ethylene-propylene random copolymer segment (B) chemically bonded to said segment (A), and subsequently, in the second stage, carrying out a conventional polymerization of the propylene monomer and a copolymerization of the ethylene-propylene mixed monomers in the presence of both the olefin polymerization catalyst and the resulting A-B type block copolymers (C).

In the present invention, any known catalysts for olefin polymerization can be used. It is preferred to use the catalysts for a stereoregular olefin polymerization. For example, the catalysts that can be used include titanium trichloride catalysts, so-called Ziegler catalysts such as carrier-type catalysts in which titanium tetrachloride is carried on magnesium chloride, and metallocene catalysts having active points on Ti, Zr or Hf.

As the titanium trichloride catalysts can be used, without a special restriction, those catalysts which are disclosed in Japanese Patent Kokai 57-55906, 56-155208 and 50-108385.

More specifically, titanium trichloride catalysts can be used, which are obtained by reducing titanium tetrachloride with hydrogen or metallic aluminum, followed by pulverizing for activation or by reducing titanium tetrachloride with an organoaluminum compound or further activating. Most preferred catalysts are titanium trichloride compositions prepared by reducing titanium tetrachloride with an organoaluminum compound, followed by further activation.

As the titanium tetrachloride-carried catalysts can be used, without a special restriction, those catalysts which are disclosed in Japanese Patent Kokai 50-126590, 51-92885, 52-100596, 52-147688, 56-811, 56-11908, 58-83006, 58-138706, 58-138707 and 58-138710.

More specifically, titanium tetrachloride-carried catalysts containing magnesium, titanium, halogen and an ester selected from esters of polycarboxylic acids and esters of polyhydroxy compounds can be used, which are obtained by contacting a liquid hydrocarbon solution of a magnesium compound with a titanium compound in the liquid state to form a solid product or first preparing a liquid hydrocarbon solution of the magnesium compound and the titanium compound and then forming a solid product therefrom, said reaction of forming the solid product being carried out in the presence of at least one electron donor selected from monocarboxylic acid esters, aliphatic carboxylic acids, carboxylic acid anhydrides, ketones, aliphatic ethers, aliphatic carbonates, alkoxy group-containing alcohols, aryloxy group-containing alcohols, organic silicon compounds having an Si—O—C bond and organic phosphorus compounds having a P—O—C bond, and during or after the formation of the solid product, contacting the solid product with the ester selected from esters of polycarboxyic acids and esters of polyhydroxy compounds.

As the metallocene catalysts can be used, without a special restriction, those catalysts which are disclosed in Japanese Patent Kokai 6-80720, 2-242804, 5-209013, 5-178923, 6-122718, 4-211694, 1-217012, 2-255812, 4-275294, 6-145240, 6-172433 and 63-66206, as well as WO92/05208, EP0537130, EP0545303, EP0545304, EP0537686 and DE4121368.

The metallocene catalysts used in the present process include a catalyst comprising (A) a transition metal compound having at least one π-electron conjugated ligand and (B) at least one compound selected from an aluminoxane, an ionic compound which reacts with said transition metal compound to form an ionic complex and Lewis acid, and a catalyst comprising the compound (A), the compound (B) and (C) an organoaluminum compound.

Examples of such metallocene catalysts include:
Dimethylsilylene(3-t-butylcyclopentadienyl)(fluorenyl) zirconium dichloride,
Dimethylsilylene(3-t-butylcyclopentadienyl)(fluorenyl) hafnium dichloride,
rac-Ethylene bis(indenyl)zirconium dimethyl,
rac-Ethylene bis(indenyl)zirconium dichloride,
rac-Dimethylsilylene bis(indenyl)zirconium dimethyl,
rac-Dimethylsilylene bis(indenyl)zirconium dichloride,
rac-Ethylene bis(tetrahydroindenyl)zirconium dimethyl,
rac-Ethylene bis(tetrahydroindenyl)zirconium dichloride,
rac-Dimethylsilylene bis(tetrahydroindenyl)zirconium dimethyl,
rac-Dimethylsilylene bis(tetrahydroindenyl)zirconium dichloride,
rac-Dimethylsilylene bis(2-methyl-4,5,6,7-tetrahydroindenyl)zirconium dichloride,
rac-Dimethylsilylene bis(2-methyl-4,5,6,7-tetrahydroindenyl)zirconium dimethyl,
rac-Ethylene bis(2-methyl-4,5,6,7-tetrahydroindenyl) hafnium dichloride,
rac-Dimethylsilylene bis(2-methyl-4-phenylindenyl) zirconium dichloride,
rac-Dimethylsilylene bis(2-methyl-4-phenylindenyl) zirconium dimethyl,
rac-Dimethylsilylene bis(2-methyl-4-phenylindenyl) hafnium dichloride,
rac-Dimethylsilylene bis(2-methyl-4-naphthylindenyl) zirconium dichloride,
rac-Dimethylsilylene bis(2-methyl-4-naphthylindenyl) zirconium dimethyl,
rac-Dimethylsilylene bis(2-methyl-4-naphthylindenyl) hafnium dichloride,
rac-Dimethylsilylene bis(2-methyl-4,5-benzoindenyl) zirconium dichloride,
rac-Dimethylsilylene bis(2-methyl-4,5-benzoindenyl) zirconium dimethyl,
rac-Dimethylsilylene bis(2-methyl-4,5-benzoindenyl) hafnium dichloride,
rac-Dimethylsilylene bis(2-ethyl-4-phenylindenyl) zirconium dichloride,
rac-Dimethylsilylene bis(2-ethyl-4-phenylindenyl) zirconium dimethyl,
rac-Dimethylsilylene bis(2-ethyl-4-phenylindenyl)hafnium dichloride,
rac-Dimethylsilylene bis(2-methyl-4,6-diisopropylindenyl) zirconium dichloride,
rac-Dimethylsilylene bis(2-methyl-4,6-diisopropylindenyl) zirconium dimethyl,
rac-Dimethylsilylene bis(2-methyl-4,6-diisopropylindenyl) hafnium dichloride,
Dimethylsilylene(2,4-dimethylcyclopentadienyl)(3',5'-dimethylcyclopentadienyl)titanium dichloride,
Dimethylsilylene(2,4-dimethylcyclopentadienyl)(3',5'-dimethylcyclopentadienyl)titanium dichloride,
Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dimethyl,
Dimethylsilylene(2,4-dimethylcyclopentadienyl)(3',5'-dimethylcyclopentadienyl)hafnium dichloride,
Dimethylsilylene(2,4-dimethylcyclopentadienyl)(3',5'-dimethylcyclopentadienyl)hafnium dimethyl,
Dimethylsilylene(2,3,5-trimethylcyclopentadienyl)(2',4',5'-trimethylcyclopentadienyl)titanium dichloride,
Dimethylsilylene(2,3,5-trimethylcyclopentadienyl)(2',4',5'-trimethylcyclopentadienyl)zirconium dichloride,
Dimethylsilylene(2,3,5-trimethylcyclopentadienyl)(2',4',5'-trimethylcyclopentadienyl)zirconium dimethyl,
Dimethylsilylene(2,3,5-trimethylcyclopentadienyl)(2',4',5'-trimethylcyclopentadienyl)hafnium dichloride, and
Dimethylsilylene(2,3,5-trimethylcyclopentadienyl)(2',4',5'-trimethylcyclopentadienyl)hafnium dimethyl.

Of these metallocenes, especially preferred are the following compounds:
Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dimethyl,
Dimethylsilylene(2,4-dimethylcyclopentadienyl)(3',5'-dimethylcyclopentadienyl)hafnium dichloride,
Dimethylsilylene(2,3,5-trimethylcyclopentadienyl)(2',4',5'-trimethylcyclopentadienyl)zirconium dichloride,
Dimethylsilylene(2,3,5-trimethylcyclopentadienyl)(2',4',5'-trimethylcyclopentadienyl)zirconium dimethyl,
Dimethylsilylene(2,3,5-trimethylcyclopentadienyl)(2',4',5'-trimethylcyclopentadienyl)hafnium dichloride, and
Dimethylsilylene(2,3,5-trimethylcyclopentadienyl)(2',4',5'-trimethylcyclopentadienyl)hafnium dimethyl.

The transition metal compound (A) can be combined with Compound (B), or Compounds (B) and (C) to form a catalyst, but it can be supported on a finely divided carrier. The carrier is an inorganic or organic compound. The finely divided solid in a granular or spherical form having a particle diameter of 5 to 300 μm, preferably 10 to 200 μm is used.

The inorganic compounds used for the carrier include $SiO_2$, $Al_2O_3$, $MgO$, $TiO_2$, $ZnO$ or the mixtures thereof, e.g. $SiO_2$—$Al_2O_3$, $SiO_2$—$MgO$, $SiO_2$—$TiO_2$, $SiO_2$—$Al_2O_3$—$MgO$. Of these compounds, those comprising $SiO_2$ or $Al_2O_3$ as a main component are preferred.

The organic compounds used for the carrier include polymers or copolymers of α-olefin of 2–12 carbons such as ethylene, propylene, 1-butene, 4-methyl-1-pentene, and polymers or copolymers of styrene or styrene derivatives.

These catalysts may be previously treated with co-catalysts, activators and cationizing agents, and may be used in combination with so-called electron donating compounds such as aromatic esters and silicon compounds.

As the co-catalysts can be suitably used various alkyl aluminum compounds such as triethyl aluminum, tri-isobutyl aluminum, diethyl aluminum chloride, ethyl aluminum sesquichloride, diethyl aluminum halides, di-isobutyl aluminum halides, and the like.

In the present invention, the A-B type block copolymers (C) are prepared in a tubular type continuous polymerization apparatus by continuously supplying an initially high active catalyst, e.g. a titanium tetrachloride carried on magnesium chloride and a co-catalyst such as triethyl aluminum, as well as a propylene monomer, and the ethylene-propylene mixed monomers for polymerization. The polymerization time ranging from the initiation of the polymerization of the propylene monomer until the initiation of the polymerization of the ethylene-propylene mixed monomers is controlled within the range of from 0.01 to 10 seconds. In addition, the total polymerization time is controlled within the range of from 0.02 to 20 seconds to prepare initially the polypropylene segment (A) and then the ethylene-propylene copolymer segment (B) for the production of the A-B type block copolymers (C). By varying each polymerization time, it is possible to vary the block chain length of each of the segments (A) and (B).

If the polymerization time for the propylene monomer is too short, the chain length of the resulting polypropylene segment (A) becomes insufficient, while a too long polymerization time tends to fail to give chemical bonding between the polypropylene segment (A) and the ethylene-propylene copolymer segment (B) and will produce a micro-blend of these segments (A) and (B). This is not preferable.

This polymerization step is fundamentally continuous. By continuously carrying out the polymerization for approximately one minute to two hours, it is possible to produce the A-B type block copolymer (C).

As to the polymerization reaction, a liquid phase polymerization is usually used; however, it is also possible to carry out the reaction using a liquefied propylene or in a vapor phase containing an inert gas and propylene. In the case where the liquid phase polymerization is used, it is possible to use, as a reaction solvent without a special restriction, such solvents that are usually used in olefin polymerization reactions, such as toluene, xylene, hexane, heptane, etc.

The polymerization temperature is not specially restricted, but is usually in a range of from 0 to 200° C.

The A-B type block copolymer (C) thus prepared in the above-mentioned step is used in the following polymerization step to give the propylene polymer (D). The polymer (D) can be prepared according to a conventional propylene copolymerization process either in a batchwise manner or in a continuous manner.

The homo- or co-polymer of propylene (D1) can be produced by polymerizing, in the presence of a mixture of the A-B type block copolymer (C) and a catalyst, a propylene monomer alone or, if desired, a propylene monomer containing the monomer(s) copolymerizable with propylene, by using any one of slurry polymerization methods effected in a hydrocarbon solvent such as n-hexane, n-heptane, n-octane, benzene, toluene, etc., bulk polymerization methods in a liquefied propylene and vapor phase polymerization methods.

In the case where a slurry polymerization or a bulk polymerization method is used, the polymerization temperature is usually in a range of from 20° to 90° C., preferably 50° to 80° C., and the polymerization pressure is in a range of from 0.01 to 5 MPa. In the case of a vapor phase polymerization, the polymerization temperature is usually from 20° to 150° C. and the polymerization pressure is from 0.2 to 5 MPa. In order to control the molecular weight of the products, hydrogen is usually used to adjust the MFR value of the resulting polymers in a range of from 0.1 to 1000.

Subsequently, a copolymerization reaction of the ethylene-propylene mixed monomers is followed to produce the ethylene-propylene random copolymers (D2), thereby producing the propylene-ethylene block copolymer compositon (E) of the present invention.

The copolymerization reaction of the ethylene-propylene mixed monomers is carried out at a temperature in a range of usually from 20° to 80° C., preferably from 40 to 70° C. under a pressure in a range of from 0.1 to 5 MPa. For the molecular weight control, the copolymerization reaction is effected in a vapor phase maintaining the hydrogen concentration therein in a range of from 0.1 to 10 molar percent. It is also possible to copolymerize ethylene and propylene with other α-olefins and/or non-conjugated dienes.

In making the molded products by using the propylene-ethylene block copolymer compositon (E) of the present invention, various additives and synthetic resins may be added to the composition (E), if necessary. Such additives include thermal stabilizers, anti-oxidants, ultraviolet absorbers, antistatic agents, nucleating agents, lubricants, flame retardants, anti-blocking agents, colorants and inorganic or organic fillers. The molded products are made usually by incorporating these additives into pellets of the propylene-ethylene block copolymer composition (E), kneading the resulting mixture after heat melting, and then granulating the melt into pellets to produce the molded products.

EXAMPLES

1) Measurements of Physical Properties

The methods of measuring physical properties and the evaluation standards thereof are shown below.

a) n-Heptane extraction of A-B type block copolymer (C): In a 200 ml flask are placed 0.5 g of the sample and 50 ml of n-heptane. The mixture is stirred in a nitrogen atmosphere at room temperature (about 25° C.) for 24 hours, and centrifuged (3000 rpm, 8 minutes) to remove a supernatant. A series of these operations is repeated three times, and then the extracted residue is dried at 60° C. for 2 hours under reduced pressure. The yield of the resulting polymer is measured to compare the weights of the polymer before and after the extraction operation with n-heptane.

A micro-blended ethylene-propylene random copolymer is considerably extracted with n-heptane to exhibit a large weight loss. On the contrary, the copolymer wherein the ethylene-propylene random copolymer segment is chemically bonded to the polypropylene segment does not substantially show such a weight loss.

b) Intrinsic viscosity [η]: measured by means of an Ostwald viscometer (AVS type automatic viscometer, manufactured by Mitsui Toatsu Chemicals, Inc.) using Tetralin at 135° C. as a solvent. (unit: dl/g)

c) Ethylene content: measured by infrared absorption spectrophotometry. (unit: % by weight)

d) MFR: measured at 230° C. under a load of 2.16 kg according to ASTM D-1238. (unit: g/10 min)

e) Modulus of elasticity in bending: measured according to JIS K6758. (unit: MPa).

f) Tensile strength: measured according to JIS K6758. (unit:MPa)

g) Tensile elongation: measured according to JIS K6758. (unit: %)

h) HDT: measured according to JIS K7207. (unit: ° C.)

i) Izod impact stength (II): measured according to JIS K6758. (unit: J/m).

j) Gloss: measured according to ASTM D523. (unit: %)

k) Impact-whitening: Using the same test piece as used for measuring the gloss which has a center of impact of 3.2 mm in radius, a 200 g weight is allowed to fall from a height of 50 cm on the test piece and the radius of the whitened part is measured. (unit: mm)

l) Haze: measured according to ASTM D1003. (unit: %)

Example 1 a) Preparation of Catalyst

A mixture of 150 g of magnesium ethoxide, 275 ml of 2-ethylhexyl-alcohol and 300 ml of toluene was stirred at 93° C. for 3 hours in a carbon dioxide atmosphere at 0.3 MPa, and then 400 ml of additional toluene and 400 ml of n-decane were added. The resulting solution is hereinafter referred to as magnesium carbonate solution. After stirring at 3° C. for 5 minutes, a mixture of 100 ml of toluene, 30 ml of chlorobenzene, 9 ml of tetraethoxysilane, 8.5 ml of titanium tetrachloride and 100 ml of ISOPAR G (isoparaffin hydrocarbons having an average carbon number of 10, boiling point: 156–176° C.), 50 ml of the magnesium carbonate solution was added. The resulting mixture was stirred for 5 minutes, incorporated with 22 ml of tetrahydrofuran and stirred at 60° C. for one hour. After terminating stirring and removing a supernatant liquid, the resulting solid was washed with 50 ml of toluene, incorporated with 100 ml of chlorobenzene and 100 ml of titanium tetrachloride, and stirred at 135° C. for one hour. After terminating stirring and removing a supernatant liquid, the resulting solid was incorporated with 250 ml of chlorobenzene, 100 ml of titanium tetrachloride and 2.1 ml of di-n-butyl phthalate, and stirred at 135° C. for 1.5 hours. A supernatant liquid was removed away, and the resulting solid was washed with 600 ml of toluene, 800 ml of ISOPAR G, and 400 ml of hexane in sequence to obtain a solid catalyst.

b) Polymerization Step of A-B Type Block Copolymer (C)

The A-B type block copolymer (C) was prepared using a tubular continuous polymerization apparatus (1) as shown in FIG. 1. A hexane slurry (10 liters) containing 130 g of the catalyst prepared in the above was charged in vessel (2), to which 0.68 mol/l of propylene was added. Vessel (3) was charged with 0.7 mol/l of triethyl aluminum, 70 mmol of di-isopropyldimethoxysilane as an external donor and 10 liters of a hexane solution containing 0.68 mol/l of propylene. Vessel (4) was charged with 10 liters of a hexane solution containing 0.21 mol/l of ethylene.

In the first stage, the propylene solution having the catalyst dispersed therein from the vessel (2) and the propylene solution containing triethyl aluminum and the like from the vessel (3) were continuously introduced into the top area of the tubular continuous polymerization apparatus (1) as shown in FIG. 1, and the ethylene-containing solution from the vessel (4) was continuously introduced into the intermediate area of the tubular polymerization apparatus (1). In the polymerization area (5), the propylene solution was reacted at 30° C. for 0.1 second to synthesize a polypropylene segment (A). In the subsequent polymerization area (6), propylene and ethylene were reacted for 0.1 second to synthesize an ethylene-propylene copolymer segment (B). The resulting products were transferred to a stainless steel polymerization reactor (7) having an inside volume of 50 liters and equipped with an agitator. This step was continued for one hour, and then a part of the resulting polymerized slurry was taken out to determine the intrinsic viscosity [η], ethylene content and yield of the resulting A-B type block copolymer (C).

c) n-Heptane Extraction of A-B Type Block Copolymer (C)

The A-B type block copolymer (C) as prepared above and a mixture of 0.38 g of polypropylene and 0.20 g of ethylene-propylene copolymer as prepared for comparison were extracted with n-heptane in the above manner.

|  | Weight before extraction (g) | Weight after extraction (g) |
| --- | --- | --- |
| A-B type block copolymer (C) | 0.58 | 0.55 |
| Comparative mixture | 0.58 | 0.38 | d) Polymerization Step of Propylene Polymer (D)

After the temperature within the polymerization vessel (7) was raised to 70° C., propylene and hydrogen were continuously supplied thereto for 2 hours while maintaining a total pressure at 0.8 MPa and a ratio of a hydrogen/propylene in the vapor phase at 0.24 to synthesize a homo- or co-polymer (D1) of propylene. Then, propylene was ceased to feed, the temperature within the vessel (7) was cooled to 30° C., and hydrogen and unreacted propylene were purged.

After a temperature within the polymerization vessel (7) was raised to 60° C., ethylene and propylene were supplied continuously for 2 hours in such a ratio that the ethylene content was 35% by weight and polymerized to prepare an ethylene-propylene random copolymer (D2). During polymerization, hydrogen was supplied to maintain a hydrogen concentration in a vapor phase at 1 mol %. After the polymerization was continued for 2 hours, ethylene and propylene were ceased to supply. The temperature within the vessel (7) was cooled to 30° C., and unreacted ethylene and propylene were purged. The hexane slurry was taken out, filtered off and dried.

The resulting propylene-ethylene block copolymer composition (E) was analyzed, with the results shown in Table 1.

e) Molded Product 3.0 kg of the powdery product as prepared above was incorporated with 0.003 kg of a phenolic thermal stabilizer and 0.003 kg of calcium stearate, and the mixture was blended in a high-speed mixer (trade name: Henschel Mixer) at room temperature for 10 minutes. The resulting blend was granulated with an extruder granulator having a screw diameter of 40 mm.

Then the granules were injection-molded into a test piece according to JIS using an injection molding machine at a molten resin temperature of 230° C., at a mold temperature of 50° C.

The resulting test piece was maintained in a chamber at room temperature of 23° C. and a humidity of 50% for 72 hours for conditioning, and then was measured for the physical properties, with the results shown in Table 1.

Comparative Example 1

Polymerization of propylene and copolymerization of ethylene and propylene were carried out under the same conditions as in Example 1, except that the polymerization step a) for preparing the A-B type block copolymer (C) was omitted, n-hexane (25 liters) and then triethyl aluminum (8.9 g) and di-isopropyldimethoxysilane (6.9 g) as an organic silicon compound were charged in the polymerization vessel (7) and 1.5 g of the same solid catalyst as used in Example 1 was used in the polymerization step d) for preparing the propylene polymer (D), to obtain a propylene-ethylene copolymer composition.

Molded products were made from the resulting composition under the same conditions as in Example 1.

The propylene-ethylene copolymer composition and the molded products thus obtained were measured for the physical properties, with the results shown in Table 1.

The resulting molded products are found inferior to those obtained in Example 1 in respect of the tensile elongation, impact resistance, gloss, stress-whitening resistance and transparency.

Examples 2 & 3 and Comparative Examples 2 & 3

The same procedure as in Example 1 was used, but varying the continuation of polymerization to 10 minutes, 2 hours, 50 seconds and 5 hours, respectively, in the polymerization step b) for preparing the A-B type block copolymer (C), to prepare a propylene-ethylene copolymer composition (E) having a different content of an A-B type block copolymer (C). Molded products were obtained from the different copolymer compositions (E) under the same conditions as in Example 1.

Physical properties of these molded products were measured, with the results shown in Table 1.

The physical properties of the resulting molded products are inferior to those according to the invention, when a content of an A-B type block copolymer (C) in the propylene-ethylene copolymer composition (E) is less than that according to the present invention. When it is more than that according to the invention, a yield of the total polymers obtained per unit catalyst is lowered. In such case, the molded products are of no practical use.

TABLE 1

| Item | | Example 1 | Example 2 | Example 3 | Comparative Example 1 | Comparative Example 2 | Comparative Example 3 |
|---|---|---|---|---|---|---|---|
| A-B type block copolymer (C) | | | | | | | |
| Intrinsic viscosity | [η] dl/g | 0.8 | 0.7 | 0.8 | — | 0.8 | 0.7 |
| (B) segment content | wt % | 35 | 33 | 34 | — | 34 | 34 |
| Ethylene content in (B) segment | wt % | 40 | 38 | 42 | — | 35 | 44 |
| Propylene polymer (D) | | | | | | | |
| Etylene-propylene copolymer D2 content | wt % | 12 | 12 | 13 | 13 | 13 | 13 |
| Ethylene content in D2 | wt % | 45 | 44 | 48 | 46 | 48 | 46 |
| Composition (E) | | | | | | | |
| A-B type block copolymer (C) content | wt % | 1.8 | 0.05 | 5 | — | 0.005 | 12 |
| MFR | g/10 min. | 29 | 29 | 28 | 27 | 32 | 31 |
| Yield | kg | 6.5 | 6.6 | 5.5 | 6.0 | 6.5 | 3.4 |
| Injection molded product | | | | | | | |
| Modulus of elasticity in bending | MPa | 1440 | 1460 | 1420 | 1450 | 1440 | 1390 |
| Tensile strength | MPa | 36 | 36 | 35 | 36 | 36 | 34 |
| Tensile elongation | % | >800 | >800 | >800 | 50 | 220 | >800 |
| HDT | °C. | 116 | 115 | 114 | 116 | 115 | 113 |
| Impact strength (II) | J/m | 111 | 108 | 115 | 98 | 100 | 116 |
| Gloss | % | 95 | 93 | 98 | 78 | 82 | 98 |
| Haze | % | 60 | 61 | 62 | 95 | 94 | 69 |
| Impact-whitening | mm | 0 | 1 | 0 | 15 | 10 | 0 |

[note]: In the table, impact strength (II) means Izot impact strength (II) at 23° C., and the value zero of impact-whitening refers no whitening.

Examples 4 & 5 and Comparative Examples 4 & 5

The same procedure as in Example 1 was used, but varying the reaction time in the polymerization area (5) in the polymerization step b) for preparing the A-B type block copolymer (C) in Example 1 to 0.05, 5, 0.005, and 11 seconds, respectively, and the corresponding reaction time in the polymerization area (6) to 5, 0.05, 11 and 0.005 second, respectively, to prepare the A-B type block copolymers (C) having a different content of ethylene-propylene copolymer segment (B). Then a propylene-ethylene copolymer composition (E) was produced under the same condition as in Example 1, but using the A-B type block copolymer (C) as prepared above. Molded products were made therefrom.

Physical properties of the molded products were measured, with the results shown in Table 2.

When the content of the ethylene-propylene copolymer segment (B) in the A-B type block copolymer (C) is too low or too high, the physical properties of the molded products are deteriorated.

TABLE 2

| Item | Example 4 | Example 5 | Comparative Example 4 | Comparative Example 5 |
|---|---|---|---|---|
| A-B type block copolymer (C) | | | | |
| Intrinsic viscosity [η]dl/g | 0.8 | 0.7 | 0.8 | 0.7 |
| (B) segment content wt % | 75 | 8 | 85 | 4 |
| Ethylene content in (B) segment wt % | 40 | 38 | 35 | 44 |
| Propylene polymer (D) | | | | |
| Etylene-propylene copolymer D2 content wt % | 13 | 14 | 14 | 13 |
| Ethylene content in D2 wt % | 44 | 45 | 44 | 44 |
| Composition (E) | | | | |
| A-B type block copolymer (C) content wt % | 2.5 | 2.6 | 2.2 | 2.1 |
| MFR g/10 min. | 31 | 30 | 32 | 31 |
| Yield kg | 5.8 | 5.7 | 5.6 | 5.6 |
| Injection molded product | | | | |
| Modulus of elasticity in bending MPa | 1410 | 1460 | 1350 | 1440 |
| Tensile strength MPa | 35 | 36 | 34 | 36 |
| Tensile elongation % | >800 | 440 | >800 | 150 |
| HDT ° C. | 113 | 116 | 111 | 116 |
| Impact strength (II) J/m | 115 | 110 | 115 | 106 |
| Gloss % | 98 | 92 | 96 | 85 |
| Haze % | 62 | 65 | 61 | 87 |
| Impact-whitening mm | 0 | 0 | 2 | 10 |

[note]: In the table, the impact strength (II) refers to Izot impact strength (II) at 23° C., and the value zero of impact whitening refers to no whitening.

Examples 6 & 7 and Comparative Examples 6 & 7

The same procedure as in Example 1 was used, but varying the propylene content in the vessel (3) to 0.1 mol/l, 2 mol/l, 0.01 mol/l and 2 mol/l, respectively, the ethylene content in the vessel (4) to 0.5 mol/l, 0.05 mol/l, 0.6 mol/l and 0.01 mol/l, respectively, and the reaction time in the polymerization area (5) to 0.3, 0.05, 0.5 and 0.01 second, respectively, to prepare the A-B type block copolymers (C).

A propylene-ethylene copolymer composition (E) was then prepared under the same conditions as in Example 1, but using the A-B type block copolymers (C) as prepared above. Molded products were made therefrom.

Physical properties of the molded products were measured, with the results shown in Table 3.

When an ethylene content of the A-B type block copolymer (C) is too low or too high, physical properties of the molded product are deteriorated.

Comparative Example 8

The same procedure as in Example 1 was used, but varying the propylene content in the vessel (3) to 0.001 mol/l, the ethylene content in the vessel (4) to 0.002 mol/l, and the reaction times in the polymerization areas (5) and (6) to 12 seconds, respectively, to prepare the A-B type block copolymer (C).

A propylene-ethylene copolymer composition (E) was prepared under the same condition as in Example 1, but using the A-B type block copolymer (C) as prepared above. Further, a molded product was made therefrom.

Physical properties of the molded products were measured, with the results shown in Table 3.

The intrinsic viscosity [η] of the resulting A-B type block copolymer (C) was so low that the physical properties of the molded products were deteriorated.

TABLE 3

| Item | Example 6 | Example 7 | Comparative Example 6 | Comparative Example 7 | Comparative Example 8 |
|---|---|---|---|---|---|
| A-B type block copolymer (C) | | | | | |
| Intrinsic viscosity [η]dl/g | 1.5 | 0.8 | 1.6 | 0.7 | 0.1 |
| (B) segment content wt % | 35 | 34 | 85 | 34 | 34 |
| Ethylene content in (B) segment wt % | 80 | 15 | 92 | 8 | 42 |
| Propylene polymer (D) | | | | | |
| Etylene-propylene copolymer D2 content wt % | 14 | 15 | 15 | 14 | 15 |
| Ethylene content in D2 wt % | 44 | 45 | 45 | 44 | 44 |
| Composition (E) | | | | | |
| A-B type block copolymer (C) content wt % | 2.7 | 2.6 | 2.8 | 2.2 | 3.1 |
| MFR g/10 min. | 21 | 20 | 19 | 22 | 21 |
| Yield kg | 5.8 | 5.7 | 5.6 | 5.6 | 5.6 |
| Injection molded product | | | | | |
| Modulus of elasticity in bending MPa | 1450 | 1430 | 1440 | 1420 | 1420 |
| Tensile strength MPa | 36 | 35 | 35 | 34 | 34 |
| Tensile elongation % | 440 | >800 | 220 | 180 | 110 |
| HDT ° C. | 113 | 112 | 112 | 111 | 111 |
| Impact strength (II) J/m | 118 | 110 | 115 | 106 | 102 |
| Gloss % | 93 | 98 | 86 | 88 | 82 |
| Haze % | 61 | 59 | 90 | 88 | 92 |
| Impact-whitening mm | 0 | 0 | 9 | 8 | 11 |

[note]: In the table, the impact strength (II) refers to Izot impact strength (II) at 23° C., and the value zero of impact whitening refers to no whitening.

Example 8

In the vessel (2) was charged 10 liters of a toluene solution of a metallocene-olefin polymerization catalyst comprising dimethylsilylene bis(2,3,5-trimethylcyclopentadienyl) zirconium dichloride (26 g), triisobutyl aluminum (1.8 mols) and N,N-dimethylanilinium tetra(pentafluorophenyl)borate (66 mmols) as a cationizing agent. The mixture solution was stirred at 3° C. for 2 minutes. Propylene was dissolved in 10 liters of toluene in the vessel (3) and ethylene in 10 liters of toluene in the vessel (4), respectively, at a pressure of 0.8 MPa.

The solution containing the metallocene catalyst from the vessel (2) and the propylene-containing solution from the vessel (3) were introduced to the polymerization area (5), and the ethylene-containing solution was introduced from the vessel (4) to the polymerization area (6). Polymerization of propylene and copolymerization of ethylene and propylene were carried out, respectively at 30° C. by controlling the reaction time to 0.5 second, to prepare an A-B type block copolymer (C). The products were transferred to a stainless steel polymerization reactor (7) (inside volume 50 liters) equipped with an agitator, the inside of which was replaced with nitrogen gas. A propylene-ethylene copolymer composition (E) was produced under the same conditions as in Example 1, and then molded products were made therefrom.

The properties thereof were measured, with the results shown in Table 4.

Example 9

An A-B type block copolymer (C) was prepared under the same conditions as in (a) of Example 1. A hexane slurry containing the resulting A-B type block copolymer (C) was transferred to the polymerization reactor (7), and then the hexane layer was removed by decantation. Triethyl aluminum (8.9 g) and di-isopropyldimethoxysilane (6.9 g) as an external donor were added thereto, and the temperature within the reactor was raised to 70° C. Propylene and hydrogen were continuously supplied for 2 hours, while maintaining the total pressure at 3.3 MPa and a concentration ratio of hydrogen/propylene in a vapor phase at 0.24, to polymerize propylene. Propylene was ceased to feed, the temperature within the reactor was cooled to 30° C., and hydrogen and unreacted propylene were purged to prepare a propylene polymer (D1).

The temperature within the polymerization reactor (7) was then raised to 60° C. Ethylene and propylene were continuously supplied thereinto for 2 hours by maintaining a supplying ratio of ethylene at 35% by weight, to copolymerize ethylene and propylene. The total amount of ethylene supplied was 0.5 kg. During the polymerization, hydrogen was supplied so as to maintain a hydrogen concentration in a vapor phase at 1 mol %. After the polymerization was carried out for 2 hours, supply of ethylene and propylene was ceased, and the temperature within the reactor was cooled to 30° C., unreacted ethylene and propylene were purged to obtain powders of a propylene-ethylene composition (E).

Molded products were made from the resulting powders as in Example 1, and measured for the physical properties, with the results shown in Table 4.

Examples 10 & 11 and Comparative Examples 9 & 10

The same procedure as in Example 9 was used, but changing the supplying ratio of ethylene in the copolymerization of ethylene and propylene to 10, 90, 5 and 99% by weight, respectively. Physical properties of the resulting copolymer compositions (E) and molded products made therefrom were measured, with the results shown in Table 4.

The rigidity of the molded products are decreased when the ethylene content in the copolymer composition (E) is too low, and the impact resistance is lowered when the ethylene content is too high.

TABLE 4

| Item | | Example | | | | Comparative Example | |
|---|---|---|---|---|---|---|---|
| | | 8 | 9 | 10 | 11 | 9 | 1 |
| A-B type block copolymer (C) | | | | | | | |
| Intrinsic viscosity | [η] dl/g | 0.7 | 0.9 | 0.8 | 0.8 | 0.8 | 0.8 |
| (B) segment content | wt % | 35 | 34 | 35 | 35 | 35 | 35 |
| Ethylene content in (B) segment | wt % | 80 | 42 | 40 | 40 | 40 | 40 |
| Propylene polymer (D) | | | | | | | |
| Etylene-propylene copolymer D2 content | wt % | 15 | 14 | 13 | 14 | 13 | 14 |
| Ethylene content in D2 | wt % | 45 | 46 | 15 | 75 | 8 | 92 |
| Composition (E) | | | | | | | |
| A-B type block copolymer (C) content | wt % | 2.7 | 3.1 | 1.8 | 1.8 | 1.8 | 1.8 |
| MFR | g/10 min. | 20 | 21 | 28 | 32 | 28 | 30 |
| Yield | kg | 6.1 | 5.9 | 5.8 | 6.1 | 5.5 | 6.2 |
| Injection molded product | | | | | | | |
| Modulus of elasticity in bending | MPa | 1450 | 1430 | 1390 | 1460 | 1360 | 1420 |
| Tensile strength | MPa | 36 | 35 | 34 | 36 | 32 | 35 |
| Tensile elongation | % | 440 | >800 | >800 | >800 | >800 | 440 |
| HDT | ° C. | 113 | 112 | 114 | 116 | 110 | 115 |
| Impact strength (II) | J/m | 118 | 110 | 108 | 112 | 96 | 95 |
| Gloss | % | 93 | 98 | 98 | 93 | 95 | 88 |
| Haze | % | 63 | 60 | 55 | 63 | 57 | 75 |
| Impact-whitening | mm | 0 | 0 | 0 | 0 | 0 | 0 |

[note]: In the table, impact strength (II) means Izot impact strength (II) at 23° C., and the value zero of impact-whitening refers no whitening.

Examples 12 & 13 and Comparative Examples 11 & 12

The same procedure as in Example 9 was used, but changing the polymerization time of propylene to 3, 1, 4 and ½ hours, respectively, and also the copolymerization time of ethylene and propylene to 1, 3, ⅓ and 4 hours, respectively. Physical properties of the resulting copolymer compositions (E) and molded products made therefrom were measured, with the results shown in Table 5.

The impact resistance of the molded products is markedly decreased when a polymerization ratio of the copolymer composition (D2) to the propylene polymer (D) is too low, and the rigidity is markedly decreased when the polymerization ratio is too high.

TABLE 5

|  | Example | | Comparative Example | |
|---|---|---|---|---|
| Item | 12 | 13 | 11 | 12 |
| A-B type block copolymer (C) | | | | |
| Intrinsic viscosity [η]dl/g | 0.8 | 0.8 | 0.8 | 0.8 |
| (B) segment content wt % | 35 | 35 | 35 | 35 |
| Ethylene content in (B) segment wt % | 40 | 40 | 40 | 40 |
| Propylene polymer (D) | | | | |
| Etylene-propylene copolymer D2 content wt % | 6 | 35 | 3 | 43 |
| Ethylene content in D2 wt % | 42 | 44 | 42 | 45 |
| Composition (E) | | | | |
| A-B type block copolymer (C) content wt % | 1.8 | 1.8 | 1.8 | 1.8 |
| MFR g/10 min. | 42 | 12 | 45 | 8 |
| Yield kg | 5.9 | 6.2 | 5.3 | 6.6 |
| Injection molded product | | | | |
| Modulus of elasticity in bending MPa | 1580 | 1260 | 1620 | 1180 |
| Tensile strength MPa | 38 | 30 | 39 | 28 |
| Tensile elongation % | >800 | >800 | 440 | 240 |
| HDT ° C. | 118 | 110 | 119 | 108 |
| Impact strength (II) J/m | 80 | 220 | 55 | 250 |
| Gloss % | 98 | 90 | 95 | 88 |
| Haze % | 58 | 66 | 61 | 72 |
| Impact-whitening mm | 0 | 1 | 0 | 3 |

[note]: In the table, the impact strength (II) refers to Izot impact strength (II) at 23° C., and the value zero of impact whitening refers to no whitening.

The propylene-ethylene copolymer composition (E) of the present invention comprises the A-B type block copolymer (C) wherein the polypropylene segment (A) and the ethylene-propylene random copolymer segment (B) are chemically bonded. The molded products from the composition (E) are superior to those from prior propylene-ethylene copolymer compositions in a variety of physical properties and especially in stress-whitening resistance. Thus, the propylene-ethylene copolymer composition (E) provides an enlarged use of the polypropylene composition.

What is claimed is:

1. A process of producing a propylene-ethylene block copolymer composition comprising the sequential steps of:
   a) continuously supplying an olefin polymerization catalyst and a propylene monomer to the top area of a tubular continuous polymerization apparatus to produce a polypropylene segment (A);
   b) continuously supplying an ethylene monomer to the intermediate area of the tubular type continuous polymerization apparatus in which the ethylene monomer and the propylene monomer unreacted in the step (a) are copolymerized to produce an ethylene-propylene random copolymer segment (B) and sequentially the segment (B) is chemically bonded to the terminal of the polypropylene segment (A) by a covalent bond to produce an A-B type propylene-ethylene block copolymer (C);
   c) transferring the A-B type propylene-ethylene block copolymer (C) containing the olefin polymerization catalyst produced in the step (b) to a single- or multi-stage polymerization reactor equipped with an agitator;
   d) supplying a propylene monomer or a mixed monomer of a propylene monomer and a copolymerizable monomer therewith to the polymerization reactor, followed by copolymerizing in the presence of the olefin polymerization catalyst and the A-B type propylene-ethylene block copolymer (C) to produce a propylene polymer (D1); and
   e) supplying a mixed monomer of ethylene and propylene to the polymerization reactor, followed by copolymerizing in the presence of the olefin polymerization catalyst, the A-B type propylene-ethylene block copolymer (C) and the propylene polymer (D1) to produce an ethylene-propylene random copolymer (D2), wherein each polymerization time in the steps a) and b) is controlled within the range of from 0.01 to 10 seconds.

2. The process set forth in claim 1, wherein the propylene-ethylene block copolymer composition comprises 0.01 to 10% by weight of said A-B type propylene-ethylene block copolymer (C) and 99.99 to 90% by weight of said propylene polymer (D1) and said ethylene-propylene random copolymer (D2).

3. The process set forth in claim 2, wherein said A-B type propylene-ethylene block copolymer (C) comprises 5 to 80% by weight of the ethylene-propylene random copolymer segment (B) having an ethylene content of 10 to 90% by weight.

4. The process set forth in claim 2, wherein said propylene polymer (D1) and said ethylene-propylene random copolymer (D2) comprise 60 to 95% by weight of propylene polymer (D1) and 40 to 5% by weight of ethylene-propylene random copolymer (D2).

5. The process of claim 1 wherein the total polymerization time for producing the A-B block copolymer (C) is controlled between 0.02 and 20 seconds.

6. The process of claim 1 wherein the olefin polymerization catalyst is a Ziegler catalyst.

7. The process of claim 1 wherein the olefin polymerization catalyst is a metallocene catalyst.

* * * * *

UNITED STATES PATENT AND TRADEMARK OFFICE
CERTIFICATE OF CORRECTION

PATENT NO.   : 6,355,725 B1  
DATED        : March 12, 2002  
INVENTOR(S)  : Minoru Terano et al.

It is certified that error appears in the above-identified patent and that said Letters Patent is hereby corrected as shown below:

<u>Column 18,</u>  
Line 46, insert -- type -- after "A-B" and before "block"

Signed and Sealed this

Eleventh Day of June, 2002

Attest:

Attesting Officer

JAMES E. ROGAN  
*Director of the United States Patent and Trademark Office*